Aug. 24, 1965

M. SALESSE ETAL  3,202,583
METHOD OF MAINTAINING SHEATHING CONTACT IN HOLLOW FUEL ELEMENTS DURING NUCLEAR REACTOR OPERATION

Filed May 3, 1960

Aug. 24, 1965   M. SALESSE ETAL   3,202,583
METHOD OF MAINTAINING SHEATHING CONTACT IN HOLLOW
FUEL ELEMENTS DURING NUCLEAR REACTOR OPERATION
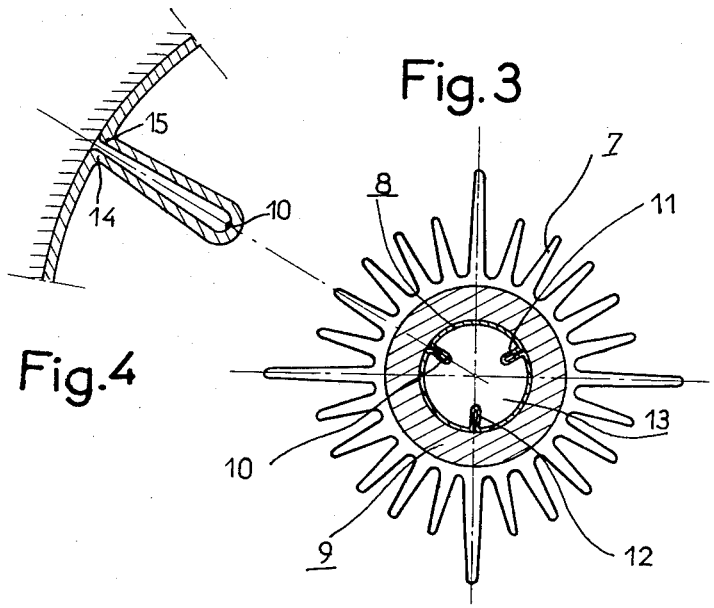
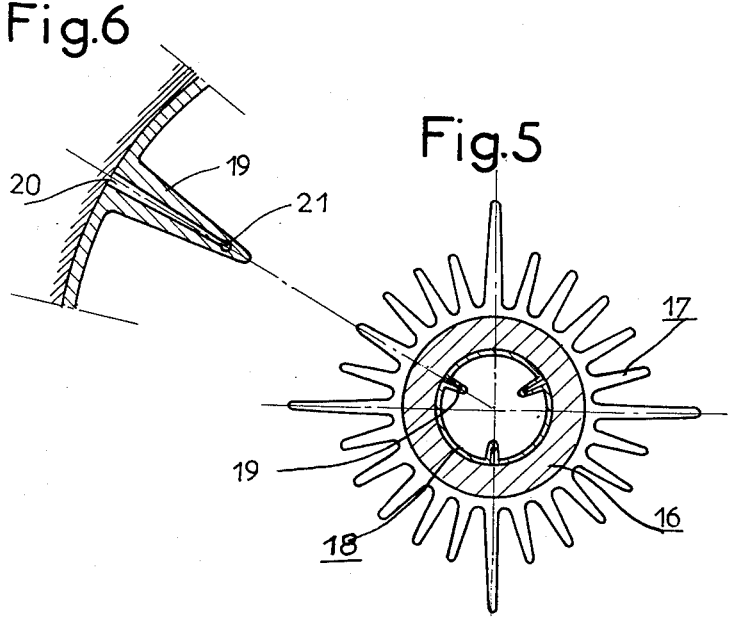

United States Patent Office 3,202,583
Patented Aug. 24, 1965

3,202,583
METHOD OF MAINTAINING SHEATHING CONTACT IN HOLLOW FUEL ELEMENTS DURING NUCLEAR REACTOR OPERATION
Marc Salesse, Gif-sur-Yvette, Jacques André Stohr, Bures-sur-Yvette, and Maurice Gauthron, Paris, France, assignors to Commissariat à l'Energie Atomique, Paris France
Filed May 3, 1960, Ser. No. 26,640
Claims priority, application France, May 13, 1959, 794,568
4 Claims. (Cl. 176—59)

One known method of improving the heat exchange between the fuel elements of nuclear reactors and the cooling or heat exchange fluid which engages with the fuel element sheathing is to provide hollow and usually cylindrical elements in which the fuel is disposed in an annular chamber between an outer metal sheet and an inner metal sheet, the sheets being interconnected at each end of the elements by a rim closure member, usually by means of welding.

As the power output of the reactor increases, the engagement between the fuel and the sheath, which is fairly satisfactory when cold, may be considerably impaired in some zones of the fuel and sheath due to the different heat expansion coefficients of the fuel and of the metal used for the sheath; the heat exchange is reduced and this factor is the limiting one in the use of hollow fuel elements which can be appropriately cooled. If a fuel is used which expands much more or much less than the sheath-forming metal, the fuel may disengage from the sheath, a factor which is all the more disadvantageous because considerable expansion of the fuel relatively to the sheath improves contact between the outer sheet of the sheath and the fuel and would therefore be desirable, were it not for the fact that it also leads to larger gaps between the said inner sheet and the fuel.

This invention has as its subject matter an improvement in the methods of sheathing hollow fuel elements for pressure-fluid-cooled nuclear reactors and, as novel industrial products, the fuel elements according to such improvements.

In the improvement according to the invention, the fuel having been surrounded by a sheath comprising an outer sheet and an inner sheet, the inner sheet is applied to the fuel by hot plastic or resilient deformation produced by the pressure cooling or heat exchange fluid, deformation of the inner sheet starting simultaneously with or subsequently to the expansion of the fuel.

The inner sheet is applied to the fuel by the pressure of the cooling fluid, the same flowing past the inside and the outside of the fuel element; like the outer sheet, the inner sheet of the sheath can comprise fins for further improving heat exchange between the fluid and the fuel; another reason for the improved heat exchange is that the intimate engagement provided by this improvement between the fuel and the sheath leads to an effective heat exchange therebetween.

As a rule, the natural expansion of the sheath is different from, and usually less than, that of the fuel so that the fuel can engage with the outer sheet of the element as the temperature rises, but such expansion tends to disengage the fuel from the inner sheet, for the heat expansion thereof is less than the heat expansion of the fuel. Above a given temperature, the pressure of the cooling fluid flowing inside the element superimposes a mechanical deformation upon the heat expansion of the inner sheet.

Where such deformation is produced only after the fuel has started to expand, the same disengages from the inner sheet at the beginning of heating, since the heat expansion of the inner sheet is less than the heat expansion of the fuel, but when the cooling fluid pressure and the temperature are high enough, the inner sheet cannot withstand the said pressure, is deformed and engages with the fuel; as the temperature continues to rise, the extension of the inner sheet is limited by the less rapidly expanding fuel, with the result that the inner sheet is engaged fairly forcibly with the fuel.

When mechanical deformation of the sheet starts simultaneously with the expansion of the fuel, there is no increase in the cold gap between the fuel and the inner sheet; more particularly, if such gap is very small there is no effective disengagement of the fuel from the inner sheet, so that the same is applied immediately to the fuel and the movements of that surface of the fuel which is opposite the inner sheet are identical with the movements thereof.

If the kind of metal used for the inner sheet and the structure thereof are appropriate, mechanical deformation of the sheathing according to the invention can start either at the beginning of heating or during heating.

One of the features of the invention is that such deformation can be plastic or resilient. A plastic deformation is produced just by the pressure of the cooling fluid when, as the temperature rises, the reduction of the mechanical features of the metal is sufficient. Plastic deformation could be produced cold but would require excessive fluid pressures out of keeping with the cooling fluid pressures used in nuclear reactors, such pressures being at present of the order of 25 kg./cm$^2$ but possibly rising to 100 kg./cm$^2$; resilient deformation means that the inner sheet must have an appropriate structure and that the metal forming the inner sheet must have mechanical characteristics different from the mechanical characteristics required for plastic deformation, so that materials such as steel have to be employed; in such a case, when the pressure cooling fluid ceases to flow inside the fuel element, the engagement between the fuel and the inner sheet ceases and the same immediately returns to its initial position.

A description will now be given, with reference to the accompanying diagrammatic drawings, of three non-limitative examples of an embodiment of the improvement in methods of sheathing hollow fuel elements for pressure-fluid-cooled nuclear reactors, according to the invention.

The first example relates to plastic deformation of the inner sheet of a hollow fuel element.

FIGURE 1 is a view in cross-section of such an element at the start of heating and before plastic deformation; and FIGURE 2 is a sectional view, taken along the line II—II of FIGURE 1, of the top part of the element shown in FIGURE 1.

The second and third examples relate to resilient deformation of the inner sheet of the hollow fuel elements.

FIGURE 3 is a cross-sectional view of the element of the second example;

FIGURE 4 is an enlarged view of a part of FIGURE 3;

FIGURE 5 is a cross-sectional view of the element of the third example; and

FIGURE 6 is an enlarged view of a part of FIGURE 5.

Figure 1:
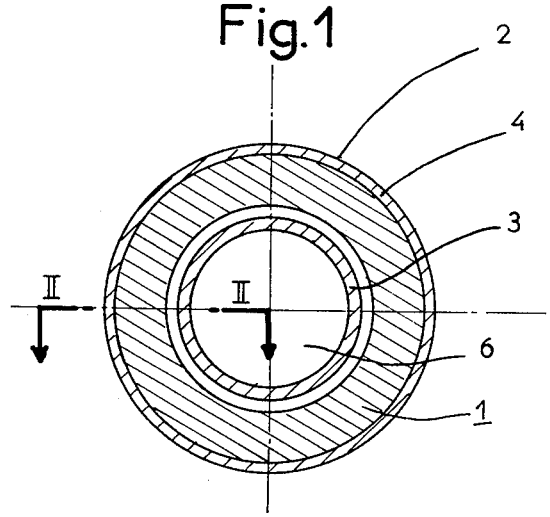
Figure 2:
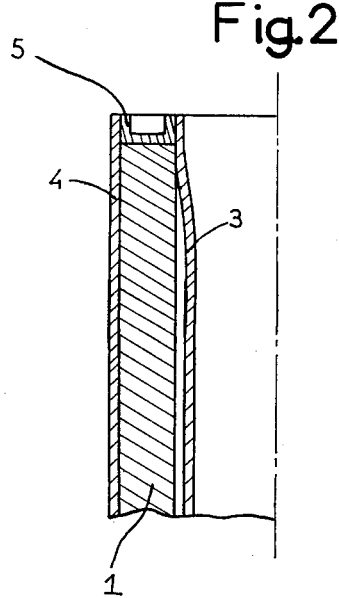

Referring to FIGURES 1 and 2, fuel 1 is disposed in a magnesium sheath 2 consisting of an inner sheet 3 and an outer sheet 4 joined together by a welded rim plug 5; when the reactor is in operation, the cooling fluid flows outside the element and in the central zone 6; the fuel 1 expands with increasing temperature and the fuel outer surface engages intimately with the outer sheet 4 which expands less rapidly than the fuel. However, the inner surface thereof disengages from the inner sheet 3 and the resultant gap may become one or two millimetres; the heat is then removed solely through the outside of the element, engagement between the sheath 2 and the fuel 1 being solely by way of the outer sheet 4. The cooling gas heats up gradually and is not cooled in the reactor heat exchangers; when the cooling gas temperature is 200° C., the reactor entry temperature, the inner sheet 3 is deformed plastically by the gas pressure which should be at least 30 kg./cm.² These numerical data are for a thickness of the magnesium of about one to two millimetres; once the inner sheet 3 has engaged with the fuel, the whole sheath performs its normal function of heat exchange and the carbon dioxide can start to be cooled in the reactor heat exchangers and the reactor can operate on full power.

An aluminium sheath can be used in the same way, but in such a case the numerical data will be different.

FIGURE 3 illustrates an outer sheet 7 and an inner sheet 8 of the sheathing of a second element having fuel 9. The outer sheet 7, comprising lengthwise fins, is made, for instance, of aluminium, while the inner sheet 8 is made, for instance, of a sheet of aluminium comprising three narrow lengthwise fins 10, 11, 12 formed by folds in the sheet; the thickness of the sheet is from one to two tenths of a millimetre; details of one such fin are illustrated in FIGURE 4. When the fuel 9 expands, the internal surface thereof moves away from its initial position in engagement with the inner sheet 8; the flow of cooling fluid in the central zone 13 of the element resiliently deforms the zones 14, 15 of the fin 10 and thus increases the diameter of the inner sheet so that the same can remain in continuous engagement with the fuel for as long as the cooling fluid flows at sufficient pressure in the reactor duct comprising the fuel element.

Referring to FIGURES 5 and 6, there can be seen the fuel 16, an outer sheet 17 and an inner sheet 18 of a third fuel element; the entire sheath is made of magnesium; the special shape of the inner sheet is produced by extrusion and its thickness in the finless zones is 1.5 mm. Each fin, as 19, is formed with a lengthwise slit 20 and a very narrow lengthwise groove 21 communicating therewith; the groove 21 is formed during extrusion and the slit 20 is cut out with a saw. The sheathing of the fuel element is similar to the sheathing in the preceding example, the inner sheet 18 being engaged continuously with the fuel by the pressure of the cooling fluid; the opening of the two arms of the fins makes resilient deformation possible, while the groove 21 prevents any fractures from starting at the junction of the arms forming the fin.

With this design, resilient deformation of the inner sheet of the sheath can be combined with the use of a substance which absorbs neutrons very little, to form the sheath.

The height of the fins 10, 11, 12 (FIGURES 4 and 3) measured radially relatively to the fuel element is about 10 mm.; the total width of the fin 19 (FIGURE 6) at its base is 5 mm. and the width of the slit 20 at the base is about 0.5 mm., while the diameter of the groove 21 is from 0.5 to 1 mm. These numerical data correspond to the working conditions of the fuel elements (under pressure and hot).

What is claimed is:

1. In a method for maintaining contact between inner sheaths and hollow cylindrical fuel portions in a nuclear reactor cooled by a heat exchange fluid in which an outer sheet is formed about and in contact with the external surface of a hollow fuel portion and an inner sheet is in engagement with the inner surface of the fuel portion until thermal expansion of the fuel portion separates the fuel portion from the inner sheet, the steps of pre-heating the heat exchange fluid by first contact with the fuel portions and then forcing the inner sheet into engagement with the inner surface of the fuel portion after thermal expansion of the fuel portion by heat and pressure applied thereto by recirculation of the heated heat exchange fluid.

2. In a method as described in claim 1, said inner sheet being plastically deformed by the heat and by the pressure applied thereto by the heat exchange fluid.

3. In a method as described in claim 1, said inner sheet being resiliently deformed by the heated heat exchange fluid.

4. In a method as described in claim 3, said inner sheet being substantially cylindrical with internal folds extending parallel to the long axis of the cylindrical inner sheet for resilient deformation of said inner sheet.

References Cited by the Examiner

UNITED STATES PATENTS

| 2,855,355 | 10/58 | Ohlinger | 176—80 |
| 2,856,337 | 10/58 | Untermeyer | 176—30 |
| 2,873,238 | 2/59 | Ohlinger et al. | 29—458 |
| 2,885,335 | 5/59 | Moore et al. | 176—77 |
| 2,886,503 | 5/59 | Szitand et al. | 176—64 |
| 2,982,712 | 5/61 | Heckman | 176—20 |
| 3,024,181 | 3/62 | Howard et al. | 176—69 |
| 3,085,954 | 4/63 | Stohr et al. | 176—73 |
| 3,129,140 | 4/64 | Stohr et al. | 176—83 X |

FOREIGN PATENTS

| 1,201,636 | 1/60 | France. |
| 829,139 | 2/60 | Great Britain. |

CARL D. QUARFORTH, *Primary Examiner*.

REUBEN EPSTEIN, OSCAR R. VERTIZ, LEON D. ROSDOL, *Examiners*.